United States Patent
Ori et al.

(10) Patent No.: US 8,118,147 B2
(45) Date of Patent: Feb. 21, 2012

(54) CABLE DISPENSING SYSTEM

(75) Inventors: Jacobi Ori, Tel Aviv (IL); Sadot Avner, Tel Aviv (IL); Hanuna Shaul, Tel Aviv (IL)

(73) Assignee: Better Place GmbH, Zug (CH)

( * ) Notice: Subject to any disclaimer, the term of this patent is extended or adjusted under 35 U.S.C. 154(b) by 9 days.

(21) Appl. No.: 12/558,430

(22) Filed: Sep. 11, 2009

(65) Prior Publication Data

US 2011/0061981 A1 Mar. 17, 2011

(51) Int. Cl.
  B65H 75/00 (2006.01)
  H02G 11/00 (2006.01)
(52) U.S. Cl. .............................. 191/12.2 R; 191/12.2 A
(58) Field of Classification Search ............ 191/12.2 R, 191/12 R, 12.4, 12.2 A; 242/378.1, 378, 242/378.2, 378.3, 378.4
  See application file for complete search history.

(56) References Cited

U.S. PATENT DOCUMENTS

| | | |
|---|---|---|
| 2,164,654 A | 7/1939 | Kersting |
| 3,197,830 A | 8/1965 | Hoadley |
| 3,409,246 A | 11/1968 | De Pas |
| 3,690,397 A | 9/1972 | Parker .............................. 180/65 |
| 3,799,063 A | 3/1974 | Reed ............................... 104/34 |
| 3,854,017 A | 12/1974 | Crim |
| D235,555 S | 6/1975 | Plummer ...................... D26/5 R |
| D237,718 S | 11/1975 | Bozich .............................. D26/12 |
| 4,052,655 A | 10/1977 | Vizza .............................. 320/2 |
| 4,102,273 A | 7/1978 | Merkle et al. ................... 104/34 |
| 4,171,109 A | 10/1979 | Roe |
| 4,309,644 A | 1/1982 | Reimers et al. ............... 318/139 |
| 4,338,587 A | 7/1982 | Chiappetti ...................... 340/32 |
| 4,347,472 A | 8/1982 | Lemelson ......................... 320/2 |
| 4,352,992 A | 10/1982 | Buennagel et al. ............. 307/40 |
| 4,365,681 A | 12/1982 | Singh ........................... 180/68.5 |
| 4,383,210 A | 5/1983 | Wilkinson ....................... 320/2 |
| 4,404,641 A | 9/1983 | Bazarnik ...................... 364/569 |
| D270,831 S | 10/1983 | Jensen .......................... D13/40 |
| D274,126 S | 6/1984 | Flies ............................. D8/347 |

(Continued)

FOREIGN PATENT DOCUMENTS

DE 3439038 A1 10/1984

(Continued)

OTHER PUBLICATIONS

Heavy Duty Connectors, May 13, 2010, 5 pgs. www.weidmuller.com (http://www.weidmuller.com).

(Continued)

*Primary Examiner* — Mark Le
(74) *Attorney, Agent, or Firm* — Morgan, Lewis & Bockius LLP (57) ABSTRACT

The cable dispensing system includes multiple parallel coils of flexible non-insulated cables separated by multiple parallel insulating discs. The insulating discs have hubs to which the inner portions of the coils are fixedly coupled. The insulating discs and coils are disposed within a housing, which is rotatably coupled to the multiple parallel insulating discs and fixedly coupled to each outer portion of the multiple coils. The cables comprising the coils are routed from the inner portions through tunnels, which extend through the insulating discs in paths parallel to the axis of the parallel insulating discs. When cords attached to the housing are extended, the coils become wound, creating an electrical short between adjacent loops of the spiral coil. The shorter conductive path reduces the amount of energy that is lost as heat.

20 Claims, 11 Drawing Sheets

U.S. PATENT DOCUMENTS

| | | | |
|---|---|---|---|
| 4,485,278 A | 11/1984 | Schaller et al. | |
| 4,532,418 A | 7/1985 | Meese et al. | 235/381 |
| 4,532,511 A | 7/1985 | Lemelson | 340/933 |
| D286,040 S | 10/1986 | LaValle | D13/24 |
| D286,854 S | 11/1986 | Fane et al. | D8/347 |
| 4,709,202 A | 11/1987 | Koenck et al. | 320/43 |
| 4,713,497 A | 12/1987 | Smith | |
| 4,744,763 A | 5/1988 | Suzuki et al. | |
| 4,789,047 A | 12/1988 | Knobloch | 184/1.5 |
| 4,791,871 A | 12/1988 | Mowll | 104/94 |
| 4,800,328 A | 1/1989 | Bolger et al. | 320/2 |
| D299,821 S | 2/1989 | Dively | D13/31 |
| 4,846,697 A | 7/1989 | Rodgers | 439/35 |
| 4,861,971 A | 8/1989 | Chan | 235/384 |
| 4,876,513 A | 10/1989 | Brilmyer et al. | 324/427 |
| 4,876,540 A | 10/1989 | Berthon et al. | 340/932.2 |
| 4,880,097 A | 11/1989 | Speas | 194/239 |
| D307,580 S | 5/1990 | Reali | D13/133 |
| D308,267 S | 5/1990 | Bradd | D32/31 |
| 4,960,150 A | 10/1990 | Ryan | 137/234.6 |
| 4,967,895 A | 11/1990 | Speas | 194/200 |
| D314,182 S | 1/1991 | Moerman | D13/152 |
| 5,003,476 A | 3/1991 | Abe | 364/424.03 |
| 5,003,520 A | 3/1991 | Grieu et al. | 368/90 |
| 5,049,802 A | 9/1991 | Mintus et al. | 320/2 |
| 5,058,044 A | 10/1991 | Stewart et al. | 364/551.01 |
| 5,072,380 A | 12/1991 | Randelman et al. | 364/406 |
| 5,078,466 A | 1/1992 | MacCulloch | |
| 5,091,856 A | 2/1992 | Hasegawa et al. | 364/424.05 |
| 5,151,865 A | 9/1992 | Blessing et al. | 364/483 |
| 5,157,319 A | 10/1992 | Klontz et al. | 320/2 |
| 5,159,272 A | 10/1992 | Rao et al. | 324/429 |
| 5,184,058 A | 2/1993 | Hesse et al. | 320/4 |
| 5,189,836 A | 3/1993 | Alder et al. | 49/33 |
| 5,202,617 A | 4/1993 | Nor | 320/2 |
| 5,206,578 A | 4/1993 | Nor | 320/14 |
| 5,229,704 A | 7/1993 | Knepper | 320/2 |
| 5,230,637 A | 7/1993 | Weber | 439/504 |
| 5,263,565 A | 11/1993 | Wilkinson | 194/216 |
| 5,297,664 A | 3/1994 | Tseng et al. | 194/217 |
| 5,306,999 A | 4/1994 | Hoffman | 320/2 |
| 5,310,356 A | 5/1994 | Obata et al. | |
| 5,315,227 A | 5/1994 | Pierson et al. | 320/2 |
| D349,099 S | 7/1994 | Robertson, Jr. et al. | D13/147 |
| 5,327,066 A | 7/1994 | Smith | 320/2 |
| 5,332,171 A | 7/1994 | Steff | |
| 5,334,023 A | 8/1994 | Schauer et al. | |
| 5,349,535 A | 9/1994 | Gupta | 364/483 |
| 5,350,312 A | 9/1994 | Kuno et al. | 439/310 |
| 5,369,352 A | 11/1994 | Toepfer et al. | 320/56 |
| 5,413,492 A | 5/1995 | Obata | |
| 5,453,585 A * | 9/1995 | Lenz et al. | 191/12.2 R |
| 5,461,299 A | 10/1995 | Bruni | 320/2 |
| 5,462,439 A | 10/1995 | Keith | 439/34 |
| 5,478,250 A | 12/1995 | Hoffman | 439/142 |
| 5,535,274 A | 7/1996 | Braitberg et al. | 379/446 |
| 5,535,960 A | 7/1996 | Skowronski et al. | |
| 5,539,399 A | 7/1996 | Takahira et al. | 340/995 |
| D373,192 S | 8/1996 | Murphy et al. | D24/129 |
| 5,542,488 A | 8/1996 | Nixon | 180/65.1 |
| 5,545,046 A | 8/1996 | Masuda et al. | 439/142 |
| 5,563,491 A | 10/1996 | Tseng | 320/2 |
| 5,566,900 A | 10/1996 | Betker et al. | |
| 5,568,390 A | 10/1996 | Hirota et al. | 364/449 |
| 5,573,090 A | 11/1996 | Ross | 191/10 |
| 5,585,205 A | 12/1996 | Kohchi | 429/99 |
| 5,586,381 A | 12/1996 | Schauer et al. | |
| 5,590,749 A * | 1/1997 | Wagner et al. | 191/12.4 |
| 5,612,606 A | 3/1997 | Guimarin et al. | 320/2 |
| 5,614,808 A | 3/1997 | Konoya et al. | 320/48 |
| 5,627,448 A | 5/1997 | Okada et al. | 320/2 |
| 5,627,752 A | 5/1997 | Buck et al. | 364/424.04 |
| 5,631,536 A | 5/1997 | Tseng | 320/15 |
| 5,644,209 A | 7/1997 | Chabbert et al. | 320/15 |
| 5,656,916 A | 8/1997 | Hotta | 320/22 |
| 5,696,367 A | 12/1997 | Keith | 235/381 |
| 5,701,706 A | 12/1997 | Kreysler et al. | 52/169.6 |
| 5,703,461 A | 12/1997 | Minoshima et al. | 320/2 |
| 5,711,648 A | 1/1998 | Hammerslag | 414/786 |
| 5,742,229 A | 4/1998 | Smith | 340/438 |
| 5,758,414 A | 6/1998 | Ehrenfels | 29/857 |
| 5,815,824 A | 9/1998 | Saga et al. | 701/22 |
| 5,821,731 A | 10/1998 | Kuki et al. | 320/108 |
| 5,822,427 A | 10/1998 | Braitberg et al. | 379/454 |
| 5,903,064 A | 5/1999 | Norberg | 307/40 |
| 5,906,500 A | 5/1999 | Kakuta et al. | 439/310 |
| 5,913,917 A | 6/1999 | Murphy | 701/123 |
| 5,927,938 A | 7/1999 | Hammerslag | 414/809 |
| 5,951,229 A | 9/1999 | Hammerslag | 414/398 |
| D415,111 S | 10/1999 | Lee | D13/154 |
| 5,979,605 A | 11/1999 | Popp | 187/205 |
| 5,998,963 A | 12/1999 | Aarseth | 320/109 |
| 6,002,396 A | 12/1999 | Davies | 345/339 |
| 6,014,597 A | 1/2000 | Kochanneck | 701/22 |
| D420,644 S | 2/2000 | Nemser et al. | D13/146 |
| 6,088,963 A | 7/2000 | Cawthon et al. | 49/33 |
| 6,094,028 A | 7/2000 | Gu et al. | 320/109 |
| D429,622 S | 8/2000 | Bickle | D8/347 |
| 6,114,632 A | 9/2000 | Planas, Sr. et al. | 174/117 R |
| 6,123,569 A | 9/2000 | Fukushima et al. | 439/456 |
| D434,001 S | 11/2000 | Sayger | D13/139.5 |
| 6,177,879 B1 | 1/2001 | Kokubu et al. | 340/825.33 |
| 6,204,505 B1 | 3/2001 | Call | 250/370.01 |
| 6,240,684 B1 | 6/2001 | Bigelow | 52/174 |
| 6,371,768 B1 | 4/2002 | Neblett et al. | 439/34 |
| 6,375,109 B1 | 4/2002 | Liao | |
| 6,388,564 B1 | 5/2002 | Piercy et al. | 340/310.01 |
| 6,416,005 B1 | 7/2002 | Liao | |
| 6,487,477 B1 | 11/2002 | Woestman et al. | 701/22 |
| 6,539,678 B1 | 4/2003 | Campbell et al. | 52/169.7 |
| 6,727,809 B1 | 4/2004 | Smith | 340/438 |
| 6,819,854 B1 | 11/2004 | Young et al. | |
| 6,909,287 B2 | 6/2005 | Bertness | 324/427 |
| D515,033 S | 2/2006 | Petrick et al. | D13/139.4 |
| 7,003,411 B2 | 2/2006 | Bertness | 702/63 |
| D517,591 S | 3/2006 | Kokido | D17/9 |
| D522,963 S | 6/2006 | Hayes et al. | D13/108 |
| 7,090,521 B2 | 8/2006 | Nishio et al. | 439/248 |
| 7,158,008 B2 | 1/2007 | Waring et al. | 340/5.66 |
| 7,201,384 B2 | 4/2007 | Chaney | 280/68.5 |
| 7,256,516 B2 | 8/2007 | Buchanan et al. | 307/62 |
| D559,785 S | 1/2008 | Tosetti | D13/147 |
| 7,400,113 B2 | 7/2008 | Osborne | 320/118 |
| 7,411,371 B2 | 8/2008 | Hobbs | 320/128 |
| 7,444,192 B2 | 10/2008 | Dickinson et al. | 700/83 |
| 7,602,143 B2 | 10/2009 | Capizzo | 320/109 |
| D607,831 S | 1/2010 | Andre et al. | D13/154 |
| 7,826,941 B2 | 11/2010 | Hayashi et al. | 701/22 |
| 2001/0002789 A1 | 6/2001 | Terazoe | 320/108 |
| 2002/0026252 A1 | 2/2002 | Wruck et al. | 700/90 |
| 2003/0209375 A1 | 11/2003 | Suzuki et al. | 180/65.3 |
| 2004/0044452 A1 | 3/2004 | Bauer et al. | 701/33 |
| 2005/0032404 A1 | 2/2005 | Furuta et al. | 439/157 |
| 2005/0138432 A1 | 6/2005 | Ransom et al. | 713/201 |
| 2005/0162172 A1 | 7/2005 | Bertness | 324/426 |
| 2006/0028171 A1 | 2/2006 | Marraffa | 320/107 |
| 2006/0149459 A1 | 7/2006 | Matsuura et al. | 701/201 |
| 2006/0185756 A1 | 8/2006 | Sato et al. | 141/94 |
| 2006/0229806 A1 | 10/2006 | Forlenza et al. | 701/207 |
| 2006/0277882 A1 | 12/2006 | Berger et al. | 56/10.2 J |
| 2007/0113921 A1 | 5/2007 | Capizzo | 141/231 |
| 2007/0241721 A1 | 10/2007 | Weinstein et al. | 320/114 |
| 2008/0258682 A1 | 10/2008 | Li | 320/109 |
| 2008/0315837 A1 | 12/2008 | Elder et al. | 320/134 |
| 2009/0011639 A1 | 1/2009 | Ballard et al. | 439/607 |
| 2009/0024232 A1 | 1/2009 | Dickinson et al. | 700/89 |
| 2010/0145717 A1 | 6/2010 | Hoeltzel | 705/1.1 |
| 2010/0280702 A1 | 11/2010 | Artus | 701/30 |
| 2010/0286938 A1 | 11/2010 | Kaneko | 702/63 |

FOREIGN PATENT DOCUMENTS

| | | |
|---|---|---|
| DE | 3518157 A1 | 11/1986 |
| DE | 10338279 A1 | 3/2005 |
| EP | 0047089 A1 | 3/1982 |
| EP | 0233638 A2 | 8/1987 |
| EP | 0476405 A1 | 9/1990 |
| EP | 0548748 A1 | 6/1993 |

| | | | |
|---|---|---|---|
| EP | 0551080 A2 | 7/1993 |
| EP | 0599528 A2 | 6/1994 |
| EP | 0644625 A2 | 3/1995 |
| EP | 0692849 A1 | 1/1996 |
| EP | 1170609 A2 | 1/2002 |
| EP | 1275936 A2 | 1/2003 |
| FR | 2685547 A1 | 6/1993 |
| FR | 2696139 A1 | 4/1994 |
| FR | 2721559 A1 | 12/1995 |
| FR | 2737694 A1 | 2/1997 |
| GB | 881145 | 11/1961 |
| GB | 1377729 | 12/1974 |
| GB | 2219151 A | 11/1989 |
| GB | 2253379 A | 9/1992 |
| JP | 2004-331020 | 11/2004 |
| JP | 2006-113892 | 4/2006 |
| WO | WO 93/02887 A1 | 2/1993 |
| WO | WO 93/08629 A1 | 4/1993 |
| WO | WO 93/08630 A1 | 4/1993 |
| WO | WO 94/09544 A1 | 4/1994 |
| WO | WO 94/11853 A1 | 5/1994 |
| WO | WO 94/26002 A1 | 11/1994 |
| WO | WO 94/28526 A1 | 12/1994 |
| WO | WO 96/01520 A1 | 1/1996 |
| WO | WO 98/21132 A1 | 5/1998 |
| WO | WO 03/031307 A1 | 4/2003 |
| WO | WO 2008/073453 A1 | 6/2008 |
| WO | WO 2008/073470 A2 | 6/2008 |
| WO | WO 2008/073472 A2 | 6/2008 |
| WO | WO 2008/073474 A2 | 6/2008 |
| WO | WO 2008/073476 A2 | 6/2008 |
| WO | WO 2008/073477 A2 | 6/2008 |
| WO | WO 2009/109826 A1 | 9/2009 |
| WO | WO 2009/156780 A1 | 12/2009 |
| WO | WO 2010/004192 A2 | 1/2010 |
| WO | WO 2010/015777 A1 | 2/2010 |
| WO | WO 2010/076457 A1 | 7/2010 |
| WO | WO 2010/124831 A2 | 11/2010 |

OTHER PUBLICATIONS

International Preliminary Examination Report for PCT/US08/77132 dated Feb. 22, 2010, 5 pgs.
European Search Report EP 08832521 dated Feb. 2, 2011, 5 pgs.
International Search Report and Written Opinion for PCT/US2008/077132 dated Dec. 1, 2008, 8 pgs.
International Search Report and Written Opinion for PCT/US2009/057594 dated Dec. 16, 2009, 9 pgs.
International Search Report and Written Opinion for PCT/US2009/057596 dated Dec. 30, 2009, 10 pgs.
International Search Report and Written Opinion for PCT/US2010/048661 dated Dec. 10, 2010, 9 pgs.
International Search Report, PCT/IB2010/002453, Dec. 20, 2011, 2 pages.

* cited by examiner

CABLE DISPENSING SYSTEM

TECHNICAL FIELD

The disclosed embodiments relate generally to cable dispensing systems. In particular, the disclosed embodiments relate to an electric cable dispensing system used for recharging the batteries of electric vehicles.

BACKGROUND

Electric vehicles are becoming more popular. Unfortunately, current battery technology requires batteries for electric vehicles to be recharged frequently. Accordingly, there is a need for systems that can quickly and efficiently couple the electric vehicle to a charge station to recharge the batteries of the vehicles.

The 120V-240V electrical outlets commonly available worldwide have several drawbacks for recharging car batteries. First, charging takes a substantial amount of time because of the relatively low voltage sources. Second, the high current required for charging the batteries often results in inefficiencies, including loss of energy as heat. Therefore, there exists a need for a retractable cable dispensing system that reduces energy loss and recharges car batteries more quickly and conveniently.

SUMMARY

The present invention addresses the above deficiencies and other problems associated with prior retractable cable dispensing systems. Embodiments of the present invention may operate at high voltage, which reduces the current and associated energy loss. Instead of traditional slip-rings that use touch brushes, embodiments of the present invention use spirals. In addition, the electrical path through the coils is decreased by creating an electrical short between the spiral loops as the coils are tightened during use. This is explained in more detail below.

Some embodiments are used at charging stations for electrical vehicles. At a charging station, a group of electrical cables may be connected to a vehicle to charge the batteries. Long fixed length cables tend to become tangled and are generally inconvenient. A retractable cable dispensing system reduces cable clutter and entanglement, but may greatly increase the electrical resistance. Embodiments described herein provide a cable dispensing system that has reduced electrical resistance.

In some embodiments, a charging station is located at a public location, such as at a service station. In other embodiments, a charging station is located at a private location, such as a garage, or in a semi-private location, such as a business campus. In some embodiments, a charging station may use a retractable cable dispensing system to connect an electrical source to a vehicle, and charge the batteries within the vehicle. In other embodiments, a vehicle exchanges batteries at a battery exchange station, and a retractable cable dispensing system connects a power source directly to the batteries or battery unit.

In accordance with some embodiments, a cable dispensing system is disclosed that comprises a housing assembly that encloses a stator. The housing assembly is rotatable about a central axis through the center of the non-rotating stator. The stator includes a plurality of parallel insulating discs that are axially aligned with the central axis. Each of the insulating discs has a centrally located hub, which may extend outward along the axis from a face of the insulating disc. The insulated discs are all attached to one another in a stacked array. The stator also includes a plurality of parallel coils of flexible non-insulated cable. Each pair of adjacent coils is separated by one of the insulating discs. Each coil has an inner portion coupled to a hub of an adjacent insulating disc, and an outer portion coupled to the housing assembly. The housing assembly encloses the stator, which includes the insulating discs.

In accordance with some embodiments, a cable dispensing system is disclosed that comprises a housing assembly that encloses a stator. The housing assembly rotates about a central axis. The stator includes a plurality of parallel hubs axially-aligned with the central axis. The hubs are fixedly coupled to each other. Each hub has a first surface and an opposing second surface substantially parallel to the first surface. The stator also includes a plurality of parallel primary coils of flexible cable. Each primary coil has an inner portion coupled to a hub, and an outer portion coupled to the housing assembly. The stator also includes a plurality of parallel secondary coils of flexible insulated data transmission cable. Each secondary coil has an inner portion coupled to a hub, and an outer portion coupled to the housing assembly. The secondary coils are separated from each adjacent primary coil by an insulating disc. The housing assembly encloses the stator, and is rotatably coupled to the hubs.

In some embodiments, the retractable cable dispensing system separates the individual coils with insulating discs, thus allowing high voltage through the coils without arcing across the coils. In some embodiments, there are multiple electrical coils, thereby increasing the amount of electrical energy that may be transferred at any one time. In some embodiments, the individual coils are unshielded, which creates a desirable electrical short (shorter electrical path) when the coils are wound or partially wound (i.e., not fully unwound). Because the coils are typically at least partially wound when the cable dispensing system is in use, the unshielded coils reduce the overall resistance through the coils, and thus reduce the amount of energy lost as heat. In some embodiments data control coils are also included, which can modify the flow of electricity through the power cables.

The disclosed embodiments help to remove key impediments to wider adoption of electric vehicles. The embodiments of a retractable cable dispensing system described herein reduce the recharge time by using high voltage connections and data communication channels to optimize recharging. The disclosed embodiments are also cost effective and environmentally friendly by reducing the amount of energy lost as wasted heat. The high voltage and shorter internal electrical path caused by the short between the loops of each coil lower electrical energy losses.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known components and elements have not been described in detail so as not to unnecessarily obscure aspects of the embodiments.

It will also be understood that, although the terms first, second, etc., or primary, secondary, etc. may be used herein to describe various elements, these elements should not be limited by these terms. These terms are only used to distinguish one element from another. For example, a primary coil could be termed a secondary coil, and, similarly, a secondary coil could be termed a primary coil, without departing from the scope of the present invention. The primary coil and the secondary coil are both coils, but they are not the same coil.

Embodiments described herein may be used at a private residence, a public charging station, a private commercial facility, or anywhere else that a car may be parked. Some embodiments described herein recharge a battery that is installed in a vehicle. Other embodiments recharge batteries that are not installed in any vehicle, while yet other embodiments are used to charge batteries that are not used to power electric cars. More generally, embodiments of the present invention may be used in rotatable electric devices, such as electric signs or robotic arms, in extension cords, in electric cranes, and other similar locations.

Figure 1:
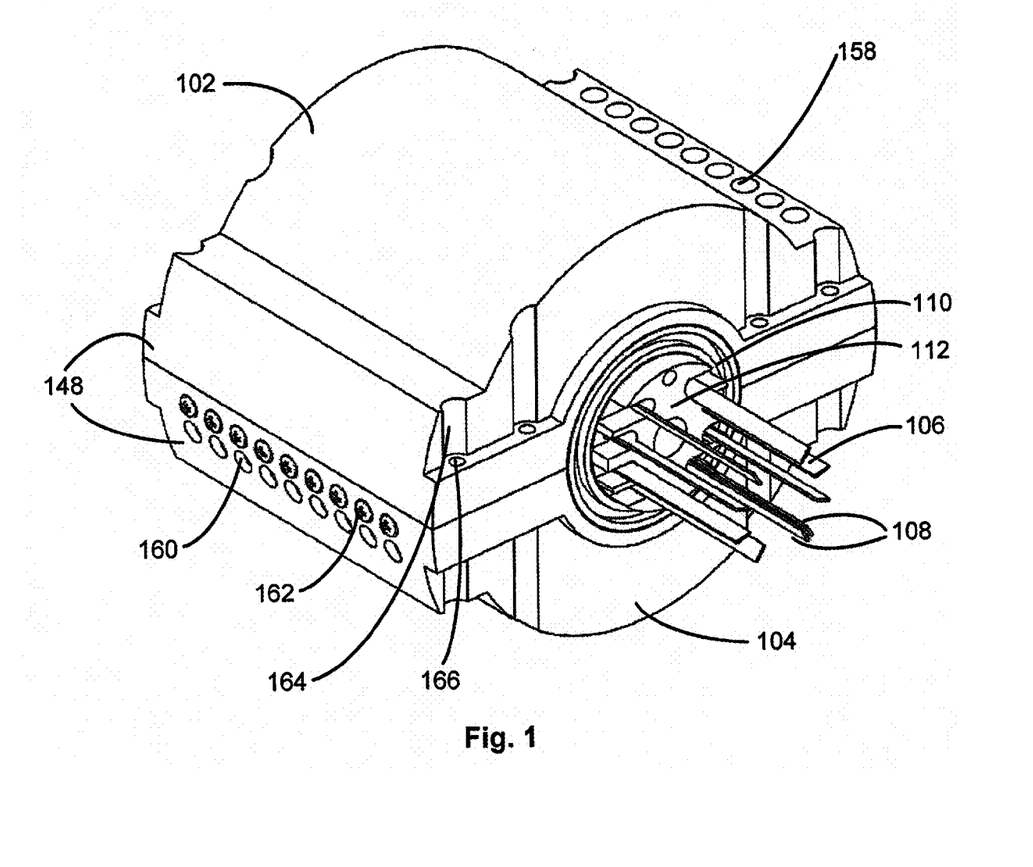
FIG. 1 provides a perspective view of a retractable cord reel cable dispensing system in accordance with some embodiments.
Figure 2:
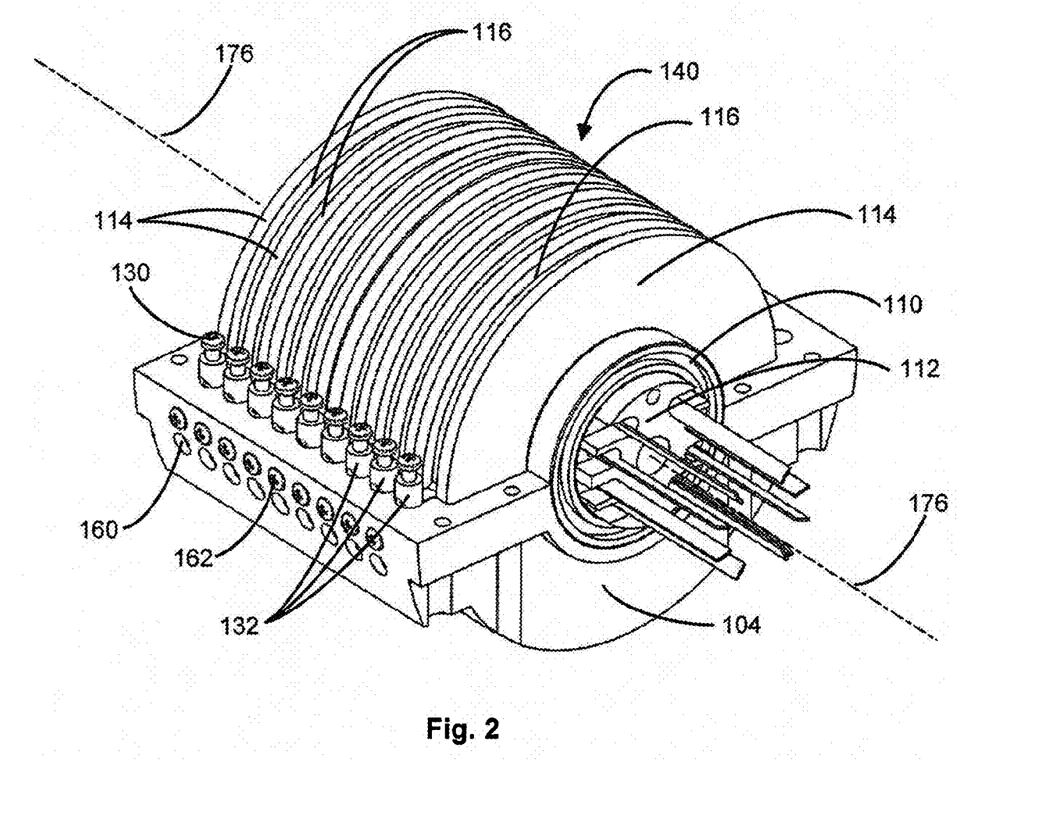
FIG. 2 provides the same view as FIG. 1, with the top half of the housing assembly removed.

FIGS. 1 and 2 illustrate a retractable cable dispensing system in accordance with some embodiments. In some embodiments the housing assembly 148 includes an upper housing unit 102 and a lower housing unit 104. In alternative embodiments, the housing assembly 148 includes more or fewer components. In FIG. 2 the upper housing unit 102 is not shown, providing a better view of the stator 140.

Figure 11:
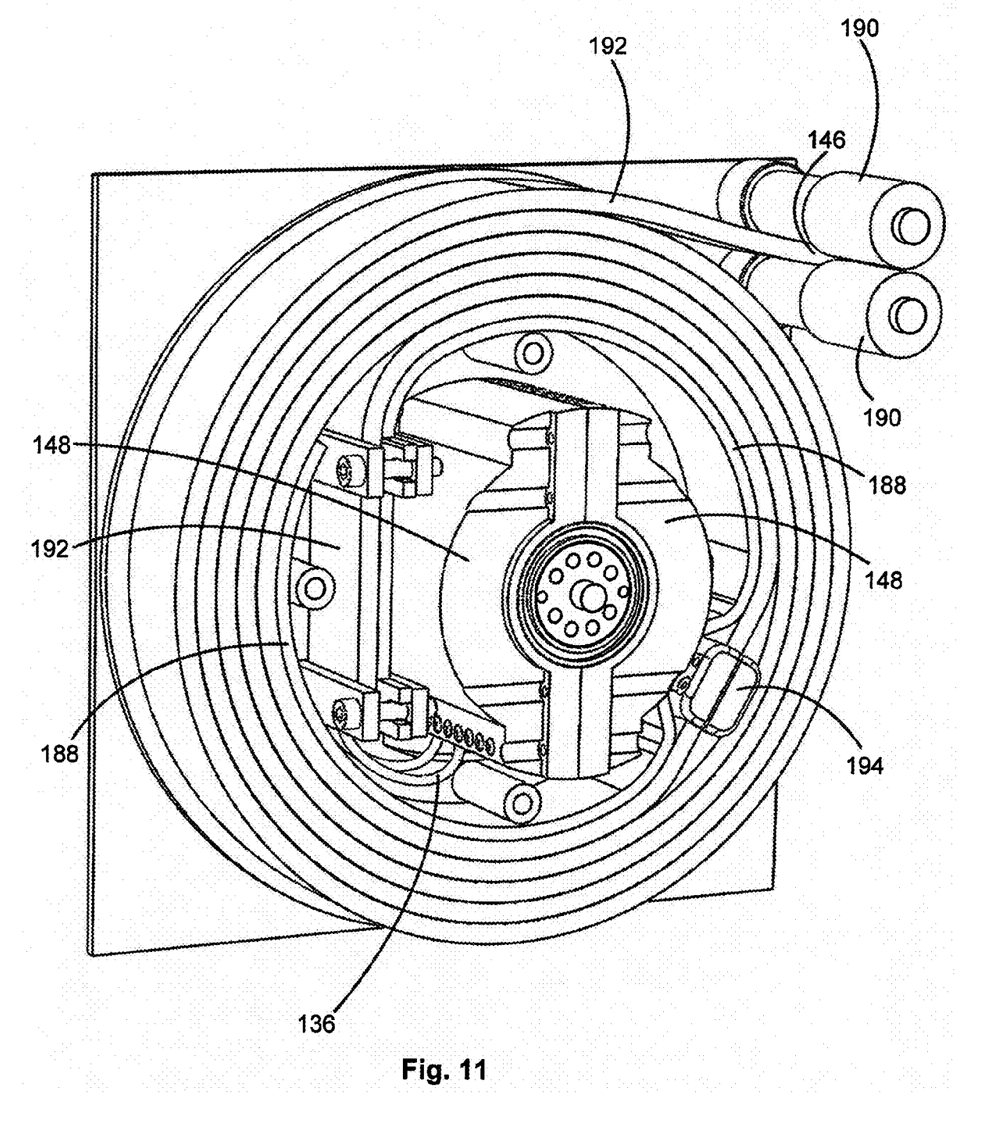
FIG. 11 provides a perspective view of an exemplary drum system that circumscribes the retractable cord reel cable dispensing system in accordance with some embodiments.

Different embodiments of the present invention have different sizes. For example, the housing assembly 148 shown in FIG. 1 may be only a centimeter wide, or could be 25 centimeters wide or larger. In some embodiments the housing assembly 148 generally has a circular cross-section when viewed along the axis 176 formed through the center of the housing assembly. In other embodiments, such as that illustrated in FIG. 1, the housing assembly 148 may deviate from a circular cross-sectional shape. The insulated cable that actually retracts will wrap around the housing assembly in some way. FIG. 11 (described in more detail below) shows an embodiment in which the housing assembly 148 is circumscribed by a drum 188, and the external cable wraps around the drum.

In some embodiments the housing assembly 148 is made from an insulating material such as plastic or ceramic. Other insulating materials may also be used for the housing assembly. In some embodiments the housing assembly, or pieces of the housing assembly, are formed by injection molding. In other embodiments the housing assembly may be formed by thermoplastic molding, thermosetting molding, machined CNC, low pressure injection (RIM), or casting of epoxy resin.

FIGS. 1 and 2 illustrate an embodiment in which uninsulated or unshielded cables 106 and shielded data communication cables 108 extend outward from an end cap 112. In some embodiments, the unshielded cables 106 are flat braid cables. In some embodiments, the unshielded cables 106 are circular or oval braid cables. In some embodiments, the unshielded cables 106 are made from a copper or tinned copper material. In other embodiments, the unshielded cables 106 comprise other conductive materials. In some embodiments, the shielded or insulated data communication cables 108 are flat braid cables as illustrated in FIGS. 1 and 2. In other embodiments, the conductive portion of shielded data communication cables 108 has an oval or circular cross section. In some embodiments, the conductive portion of the shielded data communication cables 108 comprises a single piece of material; in other embodiments, the conductive portion comprises a plurality of conductive strands and may be braided or twisted.

A rotatable bearing 110 is located between the end cap 112 and the housing assembly 148, allowing the housing assembly 148 to rotate while the end cap 112, discs, and hubs remain stationary (or vice versa). The end cap 112 is described in more detail below with respect to FIG. 5.

In some embodiments, the upper housing unit 102 is attached to the lower housing unit 104 with bolts or screws. FIG. 1 illustrates an embodiment with holes 166 through which bolts may be positioned to secure the upper housing unit 102 to the lower housing unit 104. Cut-outs 164 near the holes 166 provide space for a tool, such as a screwdriver, to manipulate bolts, screws, or the like.

FIG. 2 illustrates a parallel stack of coils 116 and insulating discs 114. As illustrated, each of the coils 116 is separated from an adjacent coil 116 by an insulating disc 114. In some embodiments, the end cap 112 is coupled to the outermost insulating disc 114 on one side of the stack of discs and coils. In some embodiments, end cap 112 is an integral part of an insulating disc that is at an end of the stack. The insulating discs 114 and coils 116 are described in more detail below with respect to FIGS. 7 and 8.

Figure 9:
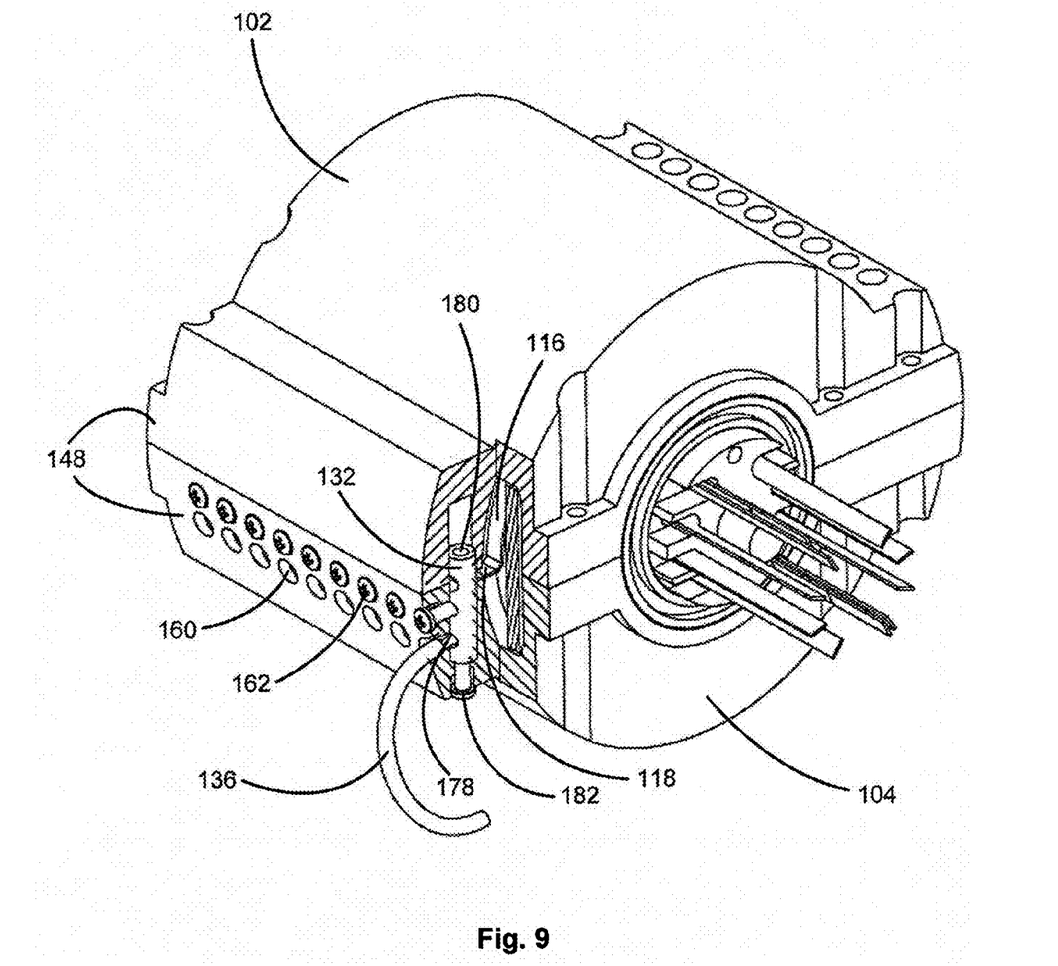
FIGS. 9 and 10 provides perspective views of a retractable cord reel cable dispensing system in accordance with some embodiments, with portions of the housing assembly cut away to see the electrical terminals.

FIGS. 1 and 2 illustrate embodiments in which there is a row of electrical terminals 132. In the embodiment of FIG. 2, the terminals 132 are only partially shown because the lower portions of the terminals are inside the lower housing unit 104 (see FIG. 9). In some embodiments, one row of cable openings 160 allow the insulated cables 136 to connect to the electrical terminals 132 (see FIG. 9). In some embodiments the row of electrical terminals 132 secure the outer portions 118 (FIG. 7) of each of the coils 116 to the housing assembly 148. FIG. 9 illustrates this in more detail. In the embodiment of FIG. 2, the cable openings 160 and the electrical terminals 132 are located in the lower housing unit 104. The row of terminals or cable openings could similarly be integrated in the upper housing unit 102. In some embodiments the row of cable openings 160 or the row of electrical terminals 132 are located along an axial length of the lower housing unit 104. In some embodiments, the cables 136 that connect through the cable openings 160 are tightened with screws 182, as shown in FIG. 9. In some embodiments, screws 130 in the electrical terminals 132 hold the outer portions 118 of coils 116 in place. One of skill in the art would recognize that there are many other ways to attach the cables 136 to housing assembly 148, or to electrically connect the outer ends 118 of the coils 116 to respective insulated cables 136. In some embodiments the upper housing unit 102 and the lower housing unit 104 are fabricated from the same mold or the same manufacturing process. In this scenario, openings 158 or other non-functional features may appear on the upper housing unit 102 because of corresponding functionality for the lower housing unit 104 (or vice versa).

Figure 3:
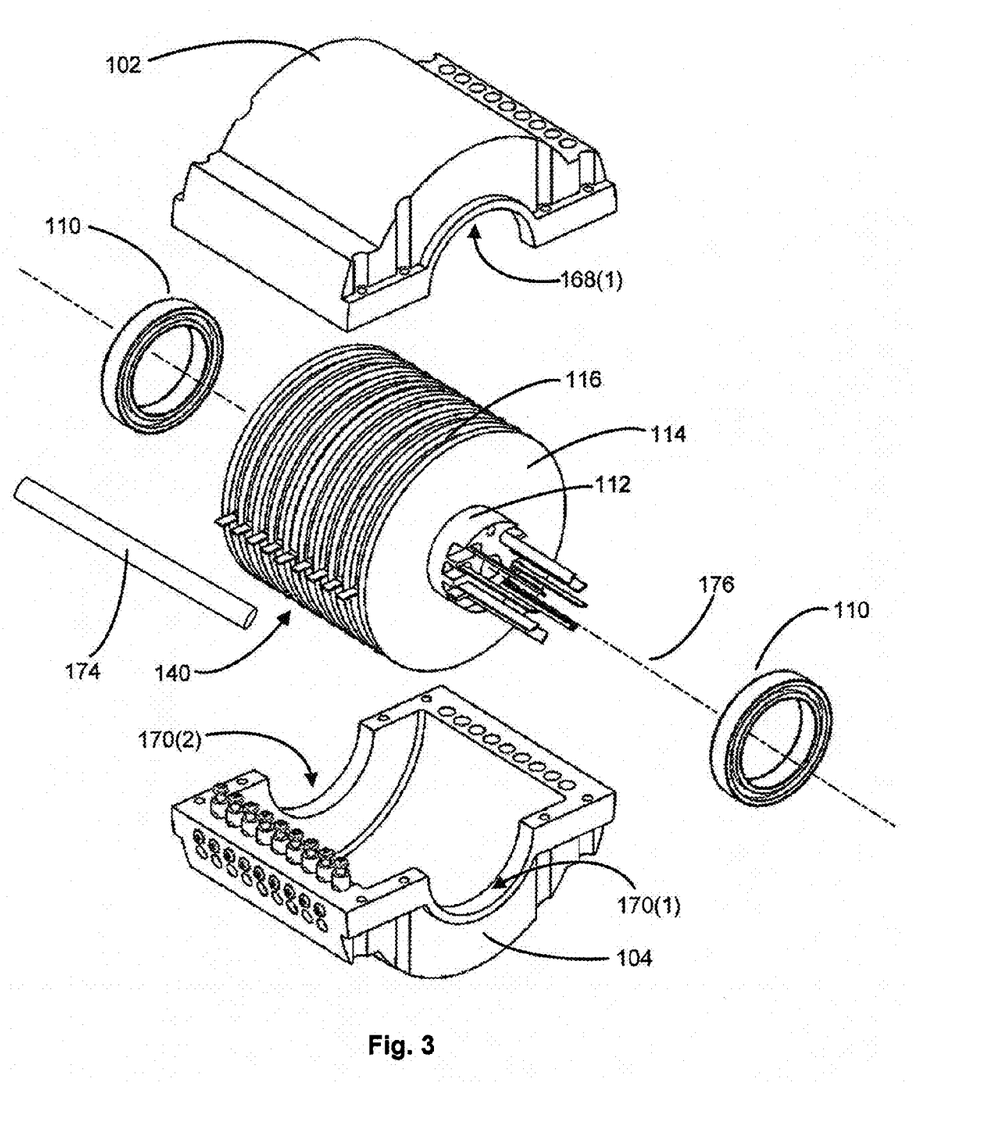
FIG. 3 provides a partially exploded perspective view of a retractable cord reel cable dispensing system shown in FIGS. 1 and 2.

As illustrated in FIG. 3, the stator 140 includes: the insulating discs 114, and the end cap 112. In some embodiments, the stator 140 remains stationary while the housing assembly 148 rotates around it. Of the housing assembly 148, insulating discs 114, coils 116, and end cap 112 all share a single longitudinal axis 176 through their centers.

The partially exploded view in FIG. 3 illustrates how the housing assembly 148 encloses the coils 116 and stator 140 in some embodiments. To allow rotation of the housing assembly 148, the inner race of bearing 110 is coupled to the outer circumference of the end cap 112, and the outer race of bearing 110 is coupled to the inner circumference of an upper cut-out 168(1) and a lower cut-out 170(1) of the housing assembly 148. In some embodiments the inner race of the bearing is coupled to the outer circumference of the end cap 112 through a force fit. In other embodiments, the inner race of the bearing is bonded to the outer circumference of the end cap 112 with an adhesive. Similarly, the outer race of bearing 110 may be coupled to the upper cut-out 168(1) and the lower cut-out 170(1) through friction fit (once the upper housing unit 102 and lower housing unit 104 are secured together), adhesive, or other techniques known to those of skill in the art.

Generally, a second bearing 110 is attached to a second end cap or hub from an outermost disc (not shown), which is located on the opposite end of the stator (opposite the end where the end cap 112 is shown in FIG. 3). In some embodiments, the second bearing 110 couples to the housing assembly 148 in a manner similar to that described above for the first bearing 110. A second bearing helps to keep the system balanced.

One of skill in the art would recognize that many different types of bearings made from many different materials could provide the proper interface between the stator 140 and the housing assembly 148, allowing the housing assembly to rotate around the stator. For example, in some embodiments, the bearings 110 are angular contact ball bearings. In some embodiments the balls and races of the bearings are made of ceramic. Some embodiments use spherical roller thrust bearings. Other embodiments use cylindrical roller bearings. In some embodiments high precision bearings are used. In some embodiments a non-metallic material, such as ceramic, is used for the bearings 110 to reduce the risk of electrical shorts or arcing. In some embodiments slide bearings are used. In alternative embodiments, the surfaces between the stator 140 and assembly housing 148 slide without the use of bearings.

Figure 5:
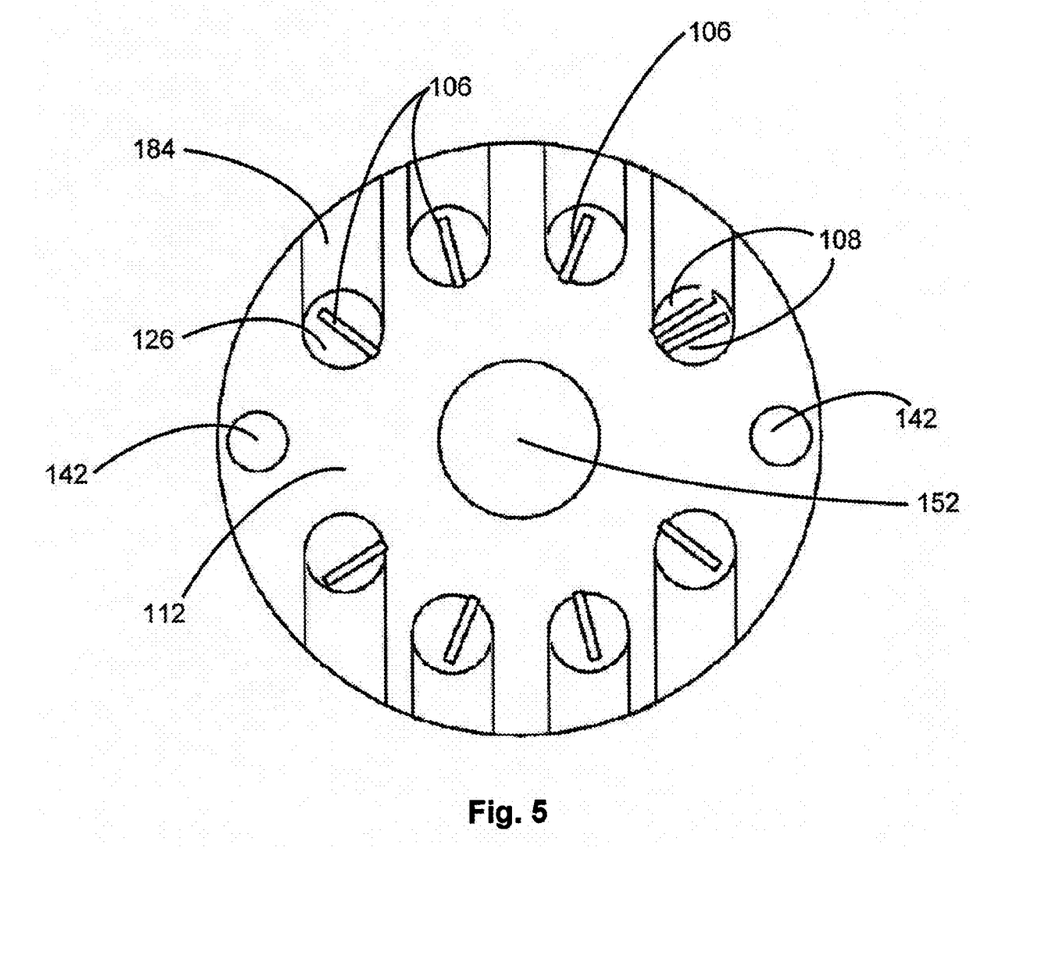
FIG. 5 is a front view of an end cap of a retractable cord reel cable dispensing system shown in FIGS. 1-4.
Figure 6:
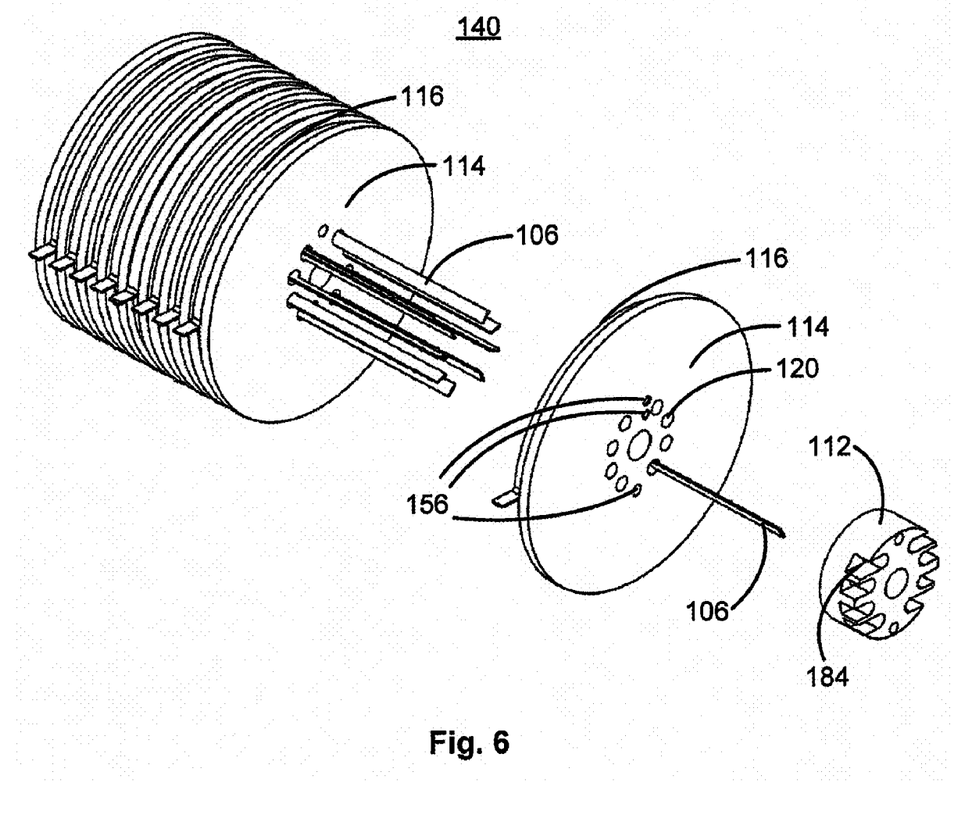
FIG. 6 provides a partially exploded view of the stator and end cap of the retractable cord reel cable dispensing system shown in FIGS. 1-5.

In some embodiments, a shaft 174 is located along the axis 176, extending through the middle of stator 140. In some embodiments where a shaft is used, the shaft 174 is fixedly coupled to the insulating discs 114 and the end cap 112. In some embodiments, the shaft is positioned within a passageway formed along the central axis of the stator 140. In particular, FIG. 5 illustrates end cap shaft opening 152, and FIG. 6 illustrates hub shaft opening 154. All of these shaft openings are aligned, and the shaft 174 is positioned within these openings.

Figure 4:
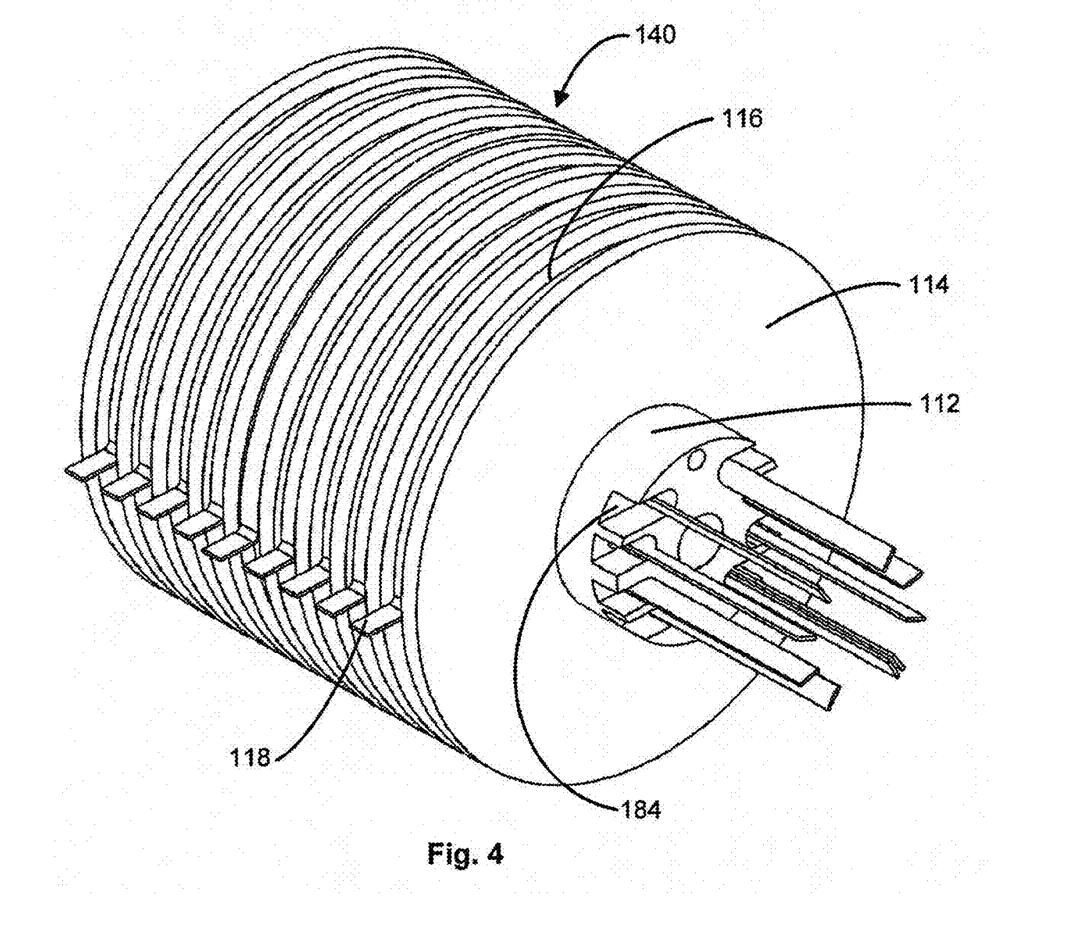
FIG. 4 is a perspective view of the stator shown in FIGS. 1-3.
Figure 10:
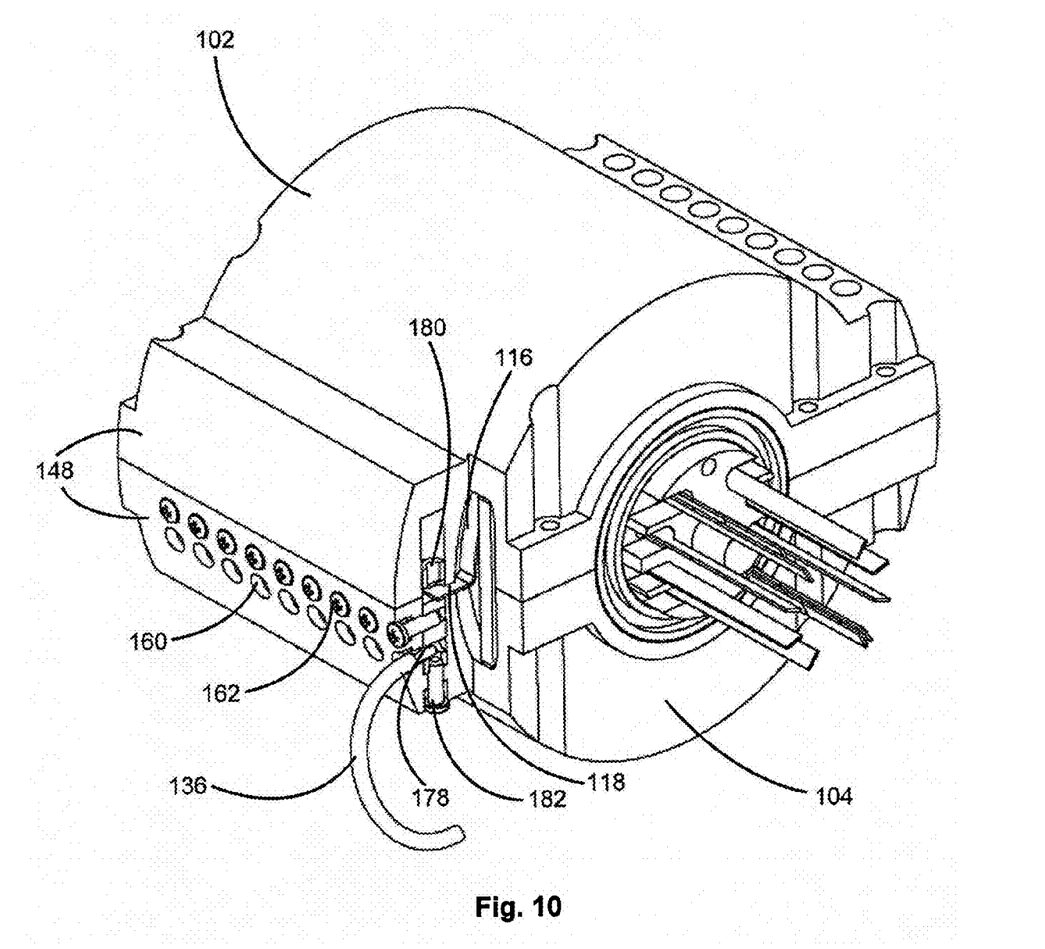

FIG. 4 provides a detailed view of the stator 140. In some embodiments, the stator 140 includes the parallel stack of insulating discs 114 and one or more end caps 112 coupled to an outermost insulating disc 114. The coils 116 interspersed between the insulating discs 114 each has an outer portion 118 that extends radially away from the axis 176 (FIG. 3). FIGS. 9 and 10 below illustrates in greater detail how the outer portions 118 of each coil 116 are coupled to the housing assembly 148 and electrically coupled to the inner ends 178 of each insulated cable 136.

In some embodiments, the insulating discs 114 are made from a ceramic material, and are sufficiently thick to prevent arcing between adjacent coils. One of skill in the art will recognize that the specific thickness of the insulating discs depends on both the permittivity of the insulating material and the intended voltage and current in the coils separated by the insulating discs. For example, the insulating discs may be 3 or 4 millimeters thick when the voltage across the coils is 400 volts. In some embodiments the insulating discs are circular, but alternative shapes could provide the same functionality as long as the electrical coils are separated from one another.

In some embodiments, the outer circumference of the end cap 112 is circular. Although a circular shape is not required, a circular shape facilitates use of commercially available bearings 110. In some embodiments, the end cap 110 is composed of ceramic or plastic. In other embodiments, alternative rigid insulating materials are used for the end cap 112.

FIG. 5 provides a front view of the end cap 112 shown in FIGS. 1-4. In this embodiment there are eight end cap tunnel segments 126, and two openings 142 for coupling the end cap 112 to the other elements of the stator 140. The tunnel segments 126 in the end cap 112 combine with the tunnel segments 120 in the insulating discs 114 (see FIG. 7) to form tunnels through the stator 140. In some embodiments, one or more bolts or pins are placed through the openings 142 and corresponding openings 156 in the insulating discs (see FIG. 7) to couple the elements of stator 140 together. In some embodiments, each end cap tunnel segment 126 receives a single unshielded cable 106 therein, or a plurality of shielded data transmission cables 108. A plurality of shielded data cables may occupy a single tunnel because the shielding and low voltage nature of the data cables does not cause arcing or shorting. As illustrated below in FIGS. 7 and 8, the end cap tunnel segments 126 combine with hub tunnel segments 120 to form tunnels through stator 140. In some embodiments, there are cut-outs 184 extending from each end cap tunnel segment 126 to the outer circumference of the end cap 112. In some embodiments, cut-outs 184 provide space to bend unshielded cables 106 or shielded data communication cables 108.

FIG. 6 provides a partially exploded view of the stator 140. In this view the end cap 112 is shown separated from the nearest insulating disc 114 and coil 116. In some embodiments end cap 112 is integrally formed with the outermost insulating disc 114, and not a separate element as illustrated in FIG. 6. In this illustration one of the parallel coils 116 and one of the parallel insulating discs 114 is shown separated from the remainder of the stator 140. FIG. 6 further illustrates that all of the coils 116, insulating discs 114, and end cap 112 are axially aligned. In some embodiments, openings 156 in the insulating discs receive pins or bolts as noted above. In other embodiments, openings 156 in the insulating discs hold the lock connector pins 186 of lock connectors 122 (described in more detail with respect to FIGS. 7 and 8). In some embodiments where the openings 156 hold lock connector pins 186, adjacent insulating discs 114 are rotated 180 degrees with respect to each other. In some embodiments, the rotational orientation of an insulating disc may be recognized by the location of the two openings 156 that are next to each other.

Figure 7:
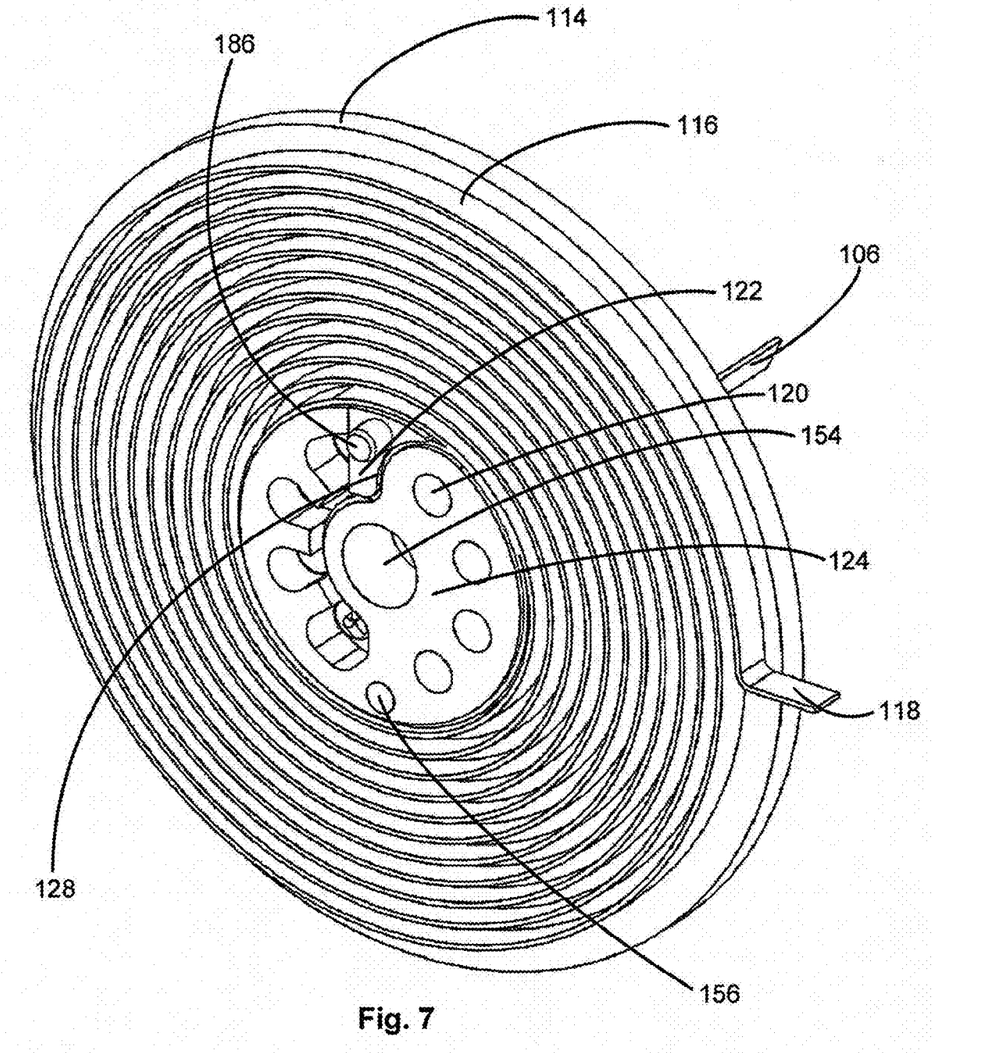
FIG. 7 is a perspective view of a coil and an insulating disc of the retractable cord reel cable dispensing system shown in FIGS. 1-6.
Figure 8:
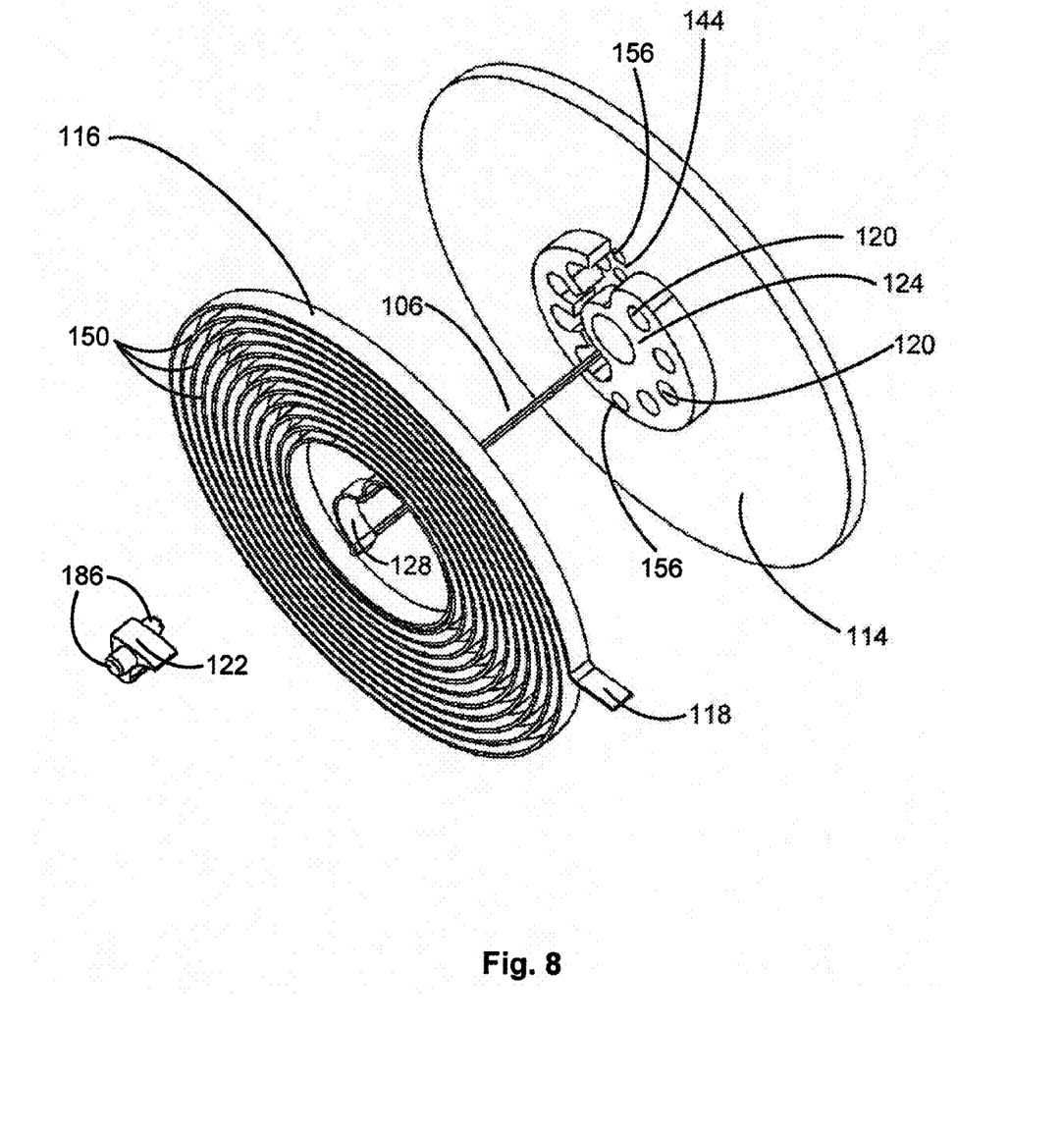
FIG. 8 is an alternative perspective view of a coil and an insulating disc of the retractable cord reel cable dispensing system shown in FIGS. 1-7, shown here with the coil separated from the insulating disc.

FIGS. 7 and 8 illustrate a single coil 116 and an adjacent insulating disc 114 to which the coil is coupled. In some embodiments, the outer portion 118 of each coil 116 is angled, enabling the outer portion 118 to couple to the housing assembly 148, as described in FIG. 1 above and FIG. 9 below. In some embodiments, the central portion of the insulating disc 114 includes a hub 124. FIG. 8 illustrates an embodiment in which the hub extends axially outward from the insulating disc 114, and the coil 116 spirals around hub 124. In other embodiments the hubs 124 are flush with the remainder of the insulating discs 114. In some embodiments, each hub 124 is integrally formed with an insulating disc 114 (e.g., molded integrally), while in other embodiments, each hub is a distinct component that is coupled to the insulating disc 114. In some embodiments each hub 124 includes the central portion of a large insulating disc 114 and a second component that is centrally coupled to the larger disc. Each hub 124 includes multiple hub tunnel segments 120 that extend through the hub 124. The hub tunnel segments 120 are thus visible (when looking at an individual insulating disc 114, as in FIGS. 7 and 8) from either side of an insulating disc 114. The hub tunnel segments 120 are aligned with the hub tunnel segments 120 of adjacent hubs and aligned with the end cap tunnel segments 126 to form tunnels through the middle of the stator 140 that are parallel to the axis 176. In some embodiments the surfaces of each hub 124 are substantially flat, and one or both surfaces of each hub 124 may coincide with the surfaces of the remainder of insulating disc 114.

As shown in FIG. 8, the inner portion 128 of each coil 116 forms the interface between the coil 116 and an unshielded cable 106 (FIGS. 1-3) that is routed through a respective tunnel and out through the end cap 112. In some embodiments the coil 116 and unshielded cable 106 consist of a single contiguous conductive cable. In other embodiments, the coil 116 and the unshielded cable 106 are distinct conductive components that are electrically coupled to one another at the inner end 128 of the coil 116.

In some embodiments the shielded data communication cables 108 are routed through a distinct tunnel in a manner similar to the unshielded cables 106 (see FIGS. 1-4). When data communication cables 108 are routed through tunnels, multiple data communication cables 108 may be routed through the same tunnel. In most embodiments data communication cables 108 do not share tunnels with unshielded cables 106 because the electric field created by the high voltage in unshielded cables 106 could interfere with the data communication. Each data communication cable 108 is similarly connected to, or contiguous with, a coil 116. Because of the low voltage and low current in the data communication cables 108, "shorting" across the spirals or loops in the corresponding coil 116 provides no significant advantage. Thus, the coils 116 attached to data communication cables 108 may be shielded or unshielded. Some embodiments do not utilize shielded communication cables 108.

In some embodiments, the inner end 128 of each coil 116 is mechanically coupled to a hub 124 using a lock connector 122. The lock connector is shaped to prevent the inner end 128 of coil 116 from moving relative to the hub 124. In some embodiments the hub 124 has a hole 144 (FIG. 8) configured to tightly receive the lock connector 122. When the lock connector 122 and the inner end 128 of coil 116 are inserted into the hole 144, it forms a tight mechanical coupling that prevents the inner end 128 from moving relative to the hub 124 as the coil 116 is wound and unwound. In some embodiments, a lock connector 122 has one or two lock connector pins 186 that insert into openings 156 in an insulating disc 114. When a lock connector 122 has two lock connector pins 186, the pins insert into two adjacent insulating discs 114. In some embodiments where the lock connectors have one or two pins 186, the pins 186 hold the lock connectors 122 tightly in place, so the lock connectors 122 need not fit tightly into holes 144. In some embodiments where the lock connectors 122 have two pins 186, the lock connectors 122 prevent adjacent insulating discs 114 from moving relative to each other, and thus provide mechanical stability to the stator 140.

FIG. 8 also helps to illustrate how the electrical path through a coil 116 is shortened when the coil is fully or partially wound (i.e., not fully uncoiled or extended). In FIG. 8 there are multiple individual spirals or loops 150. In an unwound state the spirals or loops 150 do not make contact with one another, so the electrical path is the full length of the unwound coil. As the coil 116 is wound tighter, the spiral rings 150 become closer together, and ultimately may touch each other. Because the coils are unshielded (no insulating sheath), the spirals or loops 150 that touch each other form a "short circuit" radially from one spiral ring 150 to the next. In a wound or partially wound state, the electrical path from the outer portion 118 to the inner portion 128 may be as little as the radius of the outermost spiral ring 150 because each spiral ring 150 shorts to an adjacent spiral ring 150, forming a radial electrical path or partial radial path (not only a spiral electrical path) through the coil 116. In contrast, note that the electrical path through an unwound coil 116 is the unwound length of the entire coil, which is much greater.

In one example, a coil having 12 spiral loops has an innermost spiral loop 150 with a six millimeter radius and an outermost spiral loop 150 with a sixteen millimeter radius. In a wound state the total electrical path may be as little as sixteen millimeters, going from the center to the outer portion 118 along a radial path. But in an unwound state the electrical path would be approximately the sum of twelve circumferences, which is about 83 centimeters. In this example, the electrical path in the wound state is much less than the length of the electrical path in the unwound state. This makes a significant difference in the energy loss from the coil resistance, and reduces the operating temperature of the system. In particular, the resistance is directly proportional to the length of the electrical path, and the loss of energy is directly proportional to the resistance, so any reduction in the length of the electrical path translates directly into decreased energy loss. Experimental tests have shown a reduction of up to 5° C. using unshielded cable for the coils.

FIGS. 9 and 10 illustrate an exemplary structure for coupling the outer portions 118 of the coils 116 to the housing assembly 148. Parts of the housing assembly 148 are cut away in this figure to allow visibility of the other components. FIG. 9 illustrates how the outer portion 118 inserts into terminal 132. In FIG. 10, a portion of electrical terminal 132 is cut away to further show how outer end 118 and insulated cable 136 insert into the electrical terminal 132. Each outer portion 118 is held in place by tightening a screw 130 (shown in FIG. 2) in opening 180. Each terminal 132 also connects to an insulated cable 136, which is inserted through a cable opening 160, and tightened by a screw 182. Each insulated cable 136 is wrapped around the assembly housing 148, either individually or grouped together in a single retracting cable 192 as shown in FIG. 11. Cables 136 are shielded to prevent shorting across adjacent cables. Although only one insulated cable 136 is shown in FIGS. 9 and 10, there is one insulated cable 136 corresponding to each coil 116 in the stator 140. Only a small portion of the insulated cable 136 is depicted in these figures. Each of the outer portions 118 of coils 116 is coupled to a distinct terminal 132 and held in place with a distinct tightening screw 130. FIGS. 9 and 10 thus illustrate the array of terminals 132 along an axial length of housing assembly 148. Those of skill in the art will recognize that there are many alternative structures for coupling the outer portions 118 to terminals 132. In some embodiments, screws 162 hold the terminals 132 in place so that the terminals do not move relative to the housing assembly 148.

The electrical terminals 132 may be held in place by several different means. In some embodiments, insert molding is used, placing the terminals in the intended location prior to injection. In other embodiments, ultrasonic insertion is used. In other embodiments, the space for the electrical terminals in the housing assembly is formed so that there is a tight fit when the electrical terminals are inserted. In other embodiments, the terminals 132 have a loose fit until the upper and lower housing units 102 and 104 are stuck together (at which point there is a tight fit). In some embodiments, screws (e.g., screws 162) or bolts are used to hold the electrical terminals 132 in place, and these screws or bolts may be hidden when the unit is fully assembled.

FIGS. 1-10 illustrate the internal structure of an exemplary cable dispensing system. These figures do not illustrate the retractable cables that are attached to the housing assembly 148. FIG. 11 shows an exemplary embodiment of a drum system that connects the housing assembly to an external cable that retracts. Two or more shielded cables 136 connect to the electrical terminals of the housing assembly 148. In the embodiment shown in FIG. 11, the shielded cables 136 are further encased in a retracting cable 192. Although the shielded cables 136 need not be further encased in a retracting cable 192, the use of a single retracting cable 192 helps to prevent individual shielded cables 136 from becoming tangled, bent, or otherwise damaged. The use of a single retracting cable 192 is particularly useful when there are many shielded cables 136.

The retracting cable 192 wraps around a drum 188, which may be substantially circular, as shown in the embodiment of FIG. 11. In some embodiments, there is a stop block 194 connected to the retracting cable 192. When used, the stop block 194 prevents the retracting cable 192 from retracting too far. In particular, the stop block 194 would not be able to pass through the rollers 190. One of skill in the art would recognize that there are many alternative means to prevent the retracting cable 192 from retracting too far. In addition to working with a stop block 194, rollers 190 enable smooth operation of the cable dispensing system.

The outer end 146 of the retracting cable 192 would typically connect to a plug, socket or other mechanism suitable for connecting to an external device (not shown in FIG. 11).

In some embodiments, one or more of the coils 116 is made of spring metal, which rewinds the retracting cable 192 around the housing assembly 148 after use. In other embodiments, the retracting cable 192 is rewound about the housing assembly 148 by a motor, which may be located outside of the housing unit. In some embodiments there is an external mechanical spring system connected to the housing unit 148 to rewind the retracting cable 192.

Once assembled in position, such as in a charge station or in an electrical vehicle, one end of the power cables connects to a power source and the other end connects to a load, such as a battery to be recharged. There are at least two unshielded cables 106, but in some embodiments there may be many more unshielded cables 106. The embodiment in FIGS. 1 and 2 has seven unshielded cables. Some embodiments have only unshielded cables 106, whereas other embodiments have two or more data communication cables 108 in addition to the unshielded cables 106.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A cable dispensing system for use in high-voltage electrical applications, comprising:
   a stator comprising:
      multiple parallel insulating discs fixedly attached to one another; and
      multiple parallel coils of flexible non-insulated cable, where each of the parallel coils is separated from an adjacent coil by one of the insulating discs;
   a housing assembly at least partially enclosing the stator and parallel coils, where the housing and the stator are configured to rotate relative to one another;
   a cable coupled to the housing assembly; and
   a retraction mechanism distinct from the multiple parallel coils,
   wherein the retraction mechanism is configured to rewind the cable around the housing assembly.

2. The cable dispensing system of claim 1, wherein at least some of the insulating discs include a centrally located hub.

3. The cable dispensing system of claim 2, wherein each of the coils has an inner portion coupled to a hub of a respective one of the insulating discs, and an outer end fixedly coupled to the housing assembly.

4. The cable dispensing system of claim 1, wherein the stator further comprises an end cap coupled to an axially outermost insulating disc.

5. The cable dispensing system of claim 1, further comprising a bearing disposed between the housing assembly and the stator.

6. The cable dispensing system of claim 1, wherein the housing assembly comprises an upper housing unit and a lower housing unit, the upper and lower housing units configured to mate to one another along a plane parallel to an axial length of the housing assembly, the cable dispensing system further comprising:
   multiple electrical terminals disposed along the axial length of the housing assembly, where each of the coils is connected to a respective one of the terminals.

7. The cable dispensing system of claim 6, wherein the housing assembly comprises insulating material, and the electrical terminals are integrated in the housing assembly and substantially enclosed by discrete portions of the housing assembly.

8. The cable dispensing system of claim 6, wherein the housing assembly comprises insulating material, and the electrical terminals are integrated in the housing assembly and substantially enclosed by discrete portions of the housing assembly in order to physically separate the electrical terminals with insulating material.

9. The cable dispensing system of claim 1, wherein each of the coils comprises an inner end coupled to an outer end via multiple spirals, where in an at least partially wound state, an electrical path is formed between the inner end and the outer end along an at least partially radial path between the inner end and the outer end.

10. The cable dispensing system of claim 1, further comprising at least one coil of one or more shielded and insulated data cables separated from an adjacent coil by one of the insulating discs, where the at least one coil of one or more shielded and insulated data cables is disposed within the housing.

11. The cable dispensing system of claim 1, wherein the retraction mechanism is a motor.

12. The cable dispensing system of claim 11, wherein the motor is located outside of the housing assembly.

13. The cable dispensing system of claim 1, wherein the flexible non-insulated cables consist of flexible non-insulated flat braid cables.

14. The cable dispensing system of claim 1, further comprising:
   two or more rollers defining an opening for the cable to pass through; and
   a stop block coupled to the cable, wherein the stop block is configured to interact with the rollers to prevent the cable from unreeling beyond a predefined distance.

15. A cable dispensing system for use in high-voltage electrical applications, comprising:
   multiple parallel coils of unshielded cable;
   one or more parallel insulating discs aligned with the multiple parallel coils, where adjacent coils of the multiple parallel coils are separated from one another by one of the parallel insulating discs;
   a housing assembly enclosing the parallel coils and insulating discs,
   wherein the housing assembly is rotatably coupled to the insulating discs;
     a cable coupled to the housing assembly; and
     a retraction mechanism distinct from the multiple parallel coils,
   wherein the retraction mechanism is configured to rewind the cable around the housing assembly.

16. The cable dispensing system of claim 15, further comprising multiple insulated cables each coupled to a respective one of the parallel coils, where the insulated cables are wound around the housing assembly.

17. A cable dispensing system for use in high-voltage electrical applications, comprising:
   a housing assembly with a central axis;
   multiple parallel axially-aligned hubs that are fixedly coupled to each other, wherein each hub has a first surface and a second surface substantially parallel to the first surface;
   multiple parallel primary coils of flexible cable, wherein each primary coil has an inner portion coupled to a hub, and an outer end fixedly coupled to the housing assembly;
   multiple parallel secondary coils of flexible insulated data transmission cable, wherein each secondary coil has an inner portion coupled to a hub, and an outer end fixedly coupled to the housing assembly, and wherein the secondary coils are separated from each adjacent primary coil by an insulating disc;
   a cable coupled to the housing assembly; and
   a retraction mechanism distinct from the multiple parallel primary and secondary coils, wherein the retraction mechanism is configured to rewind the cable around the housing assembly;
   wherein the housing assembly is rotatably coupled to the hubs.

18. The cable dispensing system of claim 17, wherein each of the hubs includes multiple tunnel segments that are substantially perpendicular to the first surface of the respective hub, extending from the first surface of the hub to the second surface of the hub, and the tunnel segments of adjacent hubs are aligned to form tunnels through the hubs.

19. The cable dispensing system of claim 18, wherein the cable of each primary coil is further routed from the inner portion through a distinct tunnel.

20. The cable dispensing system of claim 19, wherein the data transmission cable of each secondary coil is further routed through a tunnel that does not contain a primary cable.

* * * * *